(12) United States Patent
Takabe (10) Patent No.: US 8,523,690 B2
(45) Date of Patent: Sep. 3, 2013

(54) BOOT FOR CONSTANT VELOCITY UNIVERSAL JOINT, AND CONSTANT VELOCITY UNIVERSAL JOINT

(75) Inventor: Shinichi Takabe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/141,422

(22) PCT Filed: Dec. 15, 2009

(86) PCT No.: PCT/JP2009/070897
§ 371 (c)(1),
(2), (4) Date: Jun. 22, 2011

(87) PCT Pub. No.: WO2010/079674
PCT Pub. Date: Jul. 15, 2010

(65) Prior Publication Data
US 2011/0256941 A1 Oct. 20, 2011

(30) Foreign Application Priority Data

Jan. 9, 2009 (JP) ................................. 2009-003486

(51) Int. Cl.
*F16D 3/84* (2006.01)

(52) U.S. Cl.
USPC ......................................................... 464/173

(58) Field of Classification Search
USPC .................. 464/80, 175, 905, 906; 277/636; 74/18, 18.1, 18.2; 403/50, 51
See application file for complete search history.

(56) References Cited

U.S. PATENT DOCUMENTS

| | | | | |
|---|---|---|---|---|
| 4,558,869 A | * | 12/1985 | Grove et al. | 277/636 X |
| 4,730,834 A | * | 3/1988 | Ukai et al. | 277/636 |
| 4,895,550 A | * | 1/1990 | Baker | 464/175 |
| 4,923,432 A | * | 5/1990 | Porter | 464/175 |
| 5,176,390 A | * | 1/1993 | Lallement | 277/636 |
| 5,599,029 A | * | 2/1997 | Umeno | 277/636 |
| 5,722,669 A | * | 3/1998 | Shimizu et al. | 277/636 |

FOREIGN PATENT DOCUMENTS

| | | |
|---|---|---|
| EP | 0 464 984 | 1/1992 |
| JP | 54-19851 | 2/1979 |
| JP | 59-175721 | 11/1984 |
| JP | 62-172853 | 11/1987 |
| JP | 5-87254 | 4/1993 |
| JP | 7-10561 | 2/1995 |
| JP | 2002-257152 | 9/2002 |

OTHER PUBLICATIONS

AE-07 Universal Joint and Driveshaft Design Manual, The Society of Automotive Engineers,1979. pp. 145-149, 163. TJ1059.S62 1979.*
JIS K6253, 1993, as filed by the inventor, Nov. 26, 2012.*
International Preliminary Report on Patentability and Written Opinion of the International Searching Authority issued Aug. 25, 2011 in International (PCT) Application No. PCT/JP2009/070897.
International Search Report issued Jan. 26, 2010 in International (PCT) Application No. PCT/JP2009/070897.

* cited by examiner

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A boot has a bellows section that includes three or more peak portions and three or more valley portions. A radially outer portion of each of the peak portions in vertical cross-section of the boot is formed into a round shape. A curvature radius of the radially outer portion of a peak portion being positioned at a central portion between a large diameter section and a small diameter section is set to be larger than curvature radii of the radially outer portions of the other peak portions.

20 Claims, 6 Drawing Sheets

BOOT FOR CONSTANT VELOCITY UNIVERSAL JOINT, AND CONSTANT VELOCITY UNIVERSAL JOINT

TECHNICAL FIELD

The present invention relates to a boot for a constant velocity universal joint, and a constant velocity universal joint.

BACKGROUND ART

For the purpose of preventing intrusion of foreign matters such as dust into a joint and preventing leakage of a grease sealed inside the joint, a bellows boot is mounted to a constant velocity universal joint used for power transmission in automobiles and various industrial machineries.

Figure 3:
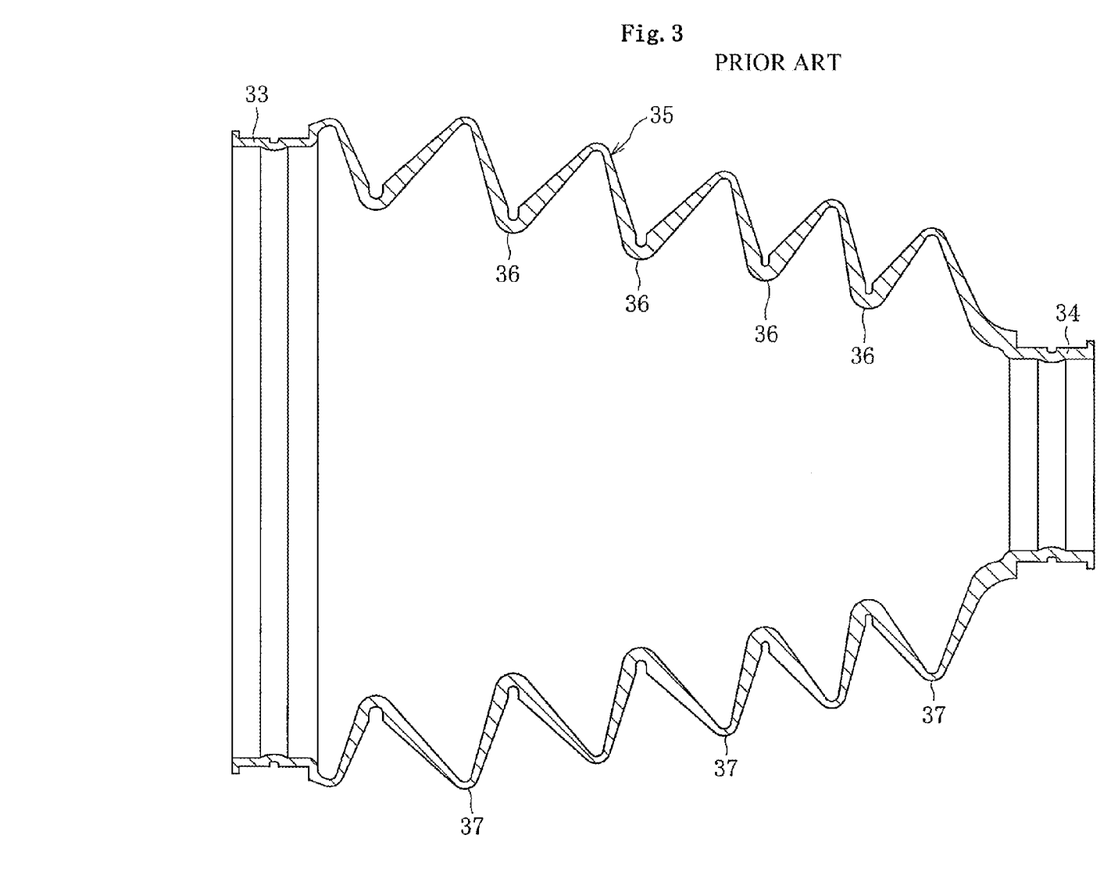
FIG. 3 is an enlarged sectional view of a conventional constant velocity universal joint.

As illustrated in FIG. 3, the boot of this type includes a large diameter section 33 fixed to an outer race as an outer joint member of the constant velocity universal joint, a small diameter section 34 fixed to a shaft extending from an inner race as an inner joint member of the constant velocity universal joint, and a bellows section 35 provided between the large diameter section 33 and the small diameter section 34 and including valley portions 36 and peak portions 37 that are formed alternately with each other. The large diameter section 33 and the small diameter section 34 are fixed by boot clamps mounted thereto.

The constant velocity universal joint has such functions as to be rotated while forming an operating angle and rotated while plunging in an axial line direction. Thus, the boot mounted thereto has a bellows shape so as to secure such flexibility as to be capable of following behavior of the constant velocity universal joint.

That is, the bellows boot is deformed so as to follow movements of the constant velocity universal joint, such as formation of an operating angle or plunging. Further, examples of the boot for a constant velocity universal joint include a rubber boot using chloroprene rubber or the like, and a resin boot using a thermoplastic elastomer material. The resin boot is excellent in durability in comparison with the rubber boot, and hence has been more widely applied.

In an example of the resin boot of this type, clearances between the peak portions 37 and the valley portions 36 connected thereto are substantially uniform, a radial step rate between the valley portions 36 and the peak portions 37 connected from the valley portions 36 toward a small diameter section side is set to fall within a range of from 26 to 36%, and thicknesses of the peak portions are set to fall within a range of from 60 to 100% of thicknesses of the valley portions connected to the peak portions 37 (Patent Literature 1). With this structure, such attempts are made as to enhance facility in folding of the bellows section, and prevent crack occurrence owing to abrasion of contact portions at the time of bending at wide angles.

CITATION LIST

Patent Literature

Patent Literature 1: Japanese Utility Model Application Laid-open No. Hei 7-10561

SUMMARY OF THE INVENTION

Technical Problems

As described above, the boot for a constant velocity universal joint is deformed so as to follow the movements of the constant velocity universal joint, such as formation of an operating angle or plunging. However, the boot is largely deformed owing to formation of high operating angles, and hence it is difficult to smoothly fold the bellows. As a result, dent may be formed in the bellows section in some cases. Further, in accordance with the deformation, abrasion occurs owing to interference of the peak portions adjacent to each other, inner surfaces of the valley portions and a shaft abrade each other owing to interference therebetween, or fatigue cracks occur owing to repeated generation of stress onto the peak portions and the valley portions. Thus, there have been demanded such shapes as to reliably maintain a stable boot-deformed state and to have higher durability in terms of abrasion resistance, fatigue resistance, and the like.

The boot for a wide angle universal joint described in Patent Literature 1 contributes to facility in folding of the bellows section, facility in mold-releasing operation at the time of molding, reduction in contact surface pressure at contact portions formed by surface contact between inclined surfaces of the bellows section at the time of bending at wide angles, and the like. However, even with such a structure, it is difficult to secure the stable boot-deformed state. In particular, at high operating angles, dent may be formed in the bellows section in some cases. In order to solve those problems, it is inevitable to give up compactness in design of the boot.

In terms of the above-mentioned problems, the present invention has been made to provide a boot, which is excellent in durability, for a constant velocity universal joint, to and provide a constant velocity universal joint capable of using such a boot, the boot being capable of conforming even to operation at high angles while being flexibly deformed and capable of effectively distributing and equalizing an interference pressure between the peak portions, an interference pressure between the valley portions and the shaft, and stress concentration onto the valley portions, and contributing to enhancement of abrasion resistance and fatigue resistance.

Solution to Problems

A boot for a constant velocity universal joint according to the present invention includes: a large diameter section mounted to an outer joint member of a constant velocity universal joint; a small diameter section mounted to a shaft coupled to an inner joint member of the constant velocity universal joint; and a bellows section arranged between the large diameter section and the small diameter section, in which the bellows section includes three or more peak portions and three or more valley portions arranged alternately with the three or more peak portions along an axial direction, in which a radially outer portion of each of the three or more peak portions in vertical cross-section of the boot is formed into a round shape, and in which a curvature radius of the radially outer portion of one or two of the three or more peak portions is set to be larger than curvature radii of the radially outer portions of others of the three or more peak portions, the one or two of the three or more peak portions being positioned at a central portion between the large diameter section and the small diameter section.

According to the boot for a constant velocity universal joint of the present invention, it is possible to distribute and equalize stress onto the peak portions and the valley portions. At this time, the curvature radii of the radially outer portions of the others of the three or more peak portions except the one or two of the three or more peak portions may be set to be equal to each other, the one or two of the three or more peak portions being positioned at the central portion between the large diameter section and the small diameter section. Alternatively, the curvature radii of the radially outer portions of the two of the three or more peak portions may be set to be large and equal to each other, and the curvature radii of the radially outer portions of the others of the three or more peak portions may be set to be equal to each other. In addition, the bellows section may include an odd number of the three or more peak portions and an odd number of the three or more valley portions, and the curvature radius of the radially outer portion of the one of the three or more peak portions may be set to be larger than the curvature radii of the radially outer portions of the others of the three or more peak portions, the one of the three or more peak portions being positioned at the central portion between the large diameter section and the small diameter section.

Further, it is preferred that a radially outer end of the one or two of the three or more peak portions be arranged on a radially inner side with respect to a straight line connecting radially outer ends of the others of the three or more peak portions, the others of the three or more peak portions being respectively on the large diameter section side and the small diameter section side and being adjacent to the one or two of the three or more peak portions, the one or two of the three or more peak portions being positioned at the central portion and having a large curvature radius. Thus, at a high operating angle, in such a phase that the bellows section is compressed, the one or two of the three or more peak portions are held in contact entirely with the others of the three or more peak portions on both sides thereof, the one or two of the three or more peak portions having a small outer-diameter dimension. As a result, the bellows section is suitable to smooth fold-deformation.

Further, a thickness of adjacent one of the three or more peak portions adjacent to nearest one of the three or more peak portions nearest to the small diameter section may be set to be equal to or smaller than thicknesses of adjacent ones of the three or more valley portions adjacent to the adjacent one of the three or more peak portions, and thicknesses of others of the three or more peak portions than the adjacent one of the three or more peak portions may be set to be larger than thicknesses of adjacent ones of the three or more valley portions adjacent to the others of the three or more peak portions than the adjacent one of the three or more peak portions.

It is preferred that the following relations be satisfied for effectively exerting the above-mentioned functions: $P2<P1<P3\leq P4$: the number of the three or more peak portions of the bellows section is four; $P2<P1\leq P3<P4\leq P5$: the number of the three or more peak portions of the bellows section is five; and $P2<P1\leq P3<P4\leq P5\leq P6$: the number of the three or more peak portions of the bellows section is six, where P1, P2, P3 . . . represent the thicknesses of the three or more peak portions positioned in order from the small diameter section side.

It is preferred that each of the three or more valley portions be formed into a U-shape in cross-section, and coupling portions for coupling the three or more peak portion and the three or more valley portion be each formed into a linear shape.

The present invention is applicable to boots for use in constant velocity universal joints of any type, such a type as to be capable of forming high operating angles of θ=45 degrees or more (for example, fixed type constant velocity universal joints of such types as to use balls, such as Rzeppa type and Birfield type) and such a type as to include a mechanism which slides in the axial line direction of the outer joint member (for example, plunging type constant velocity universal joint of double offset type, tripod type, cross groove type, and the like). In particular, it is more effective to apply the present invention to constant velocity universal joints of such a type as to be capable of forming high operating angles.

As a material of the boot, a thermoplastic polyester-based elastomer having a type-D durometer hardness according to JIS K6253 of 35 or more and 50 or less can be used.

Advantageous Effects of Invention

In the present invention, stress onto the peak portions and the valley portions can be distributed and equalized, which leads to enhancement of abrasion resistance and fatigue resistance of the boot. That is, when the constant velocity universal joint forms an operating angle, the boot is capable of firmly maintaining a shape even at a high operating angle while being flexibly deformed. Thus, at the time of deformation of the boot, an interference pressure between the peak portions, an interference pressure between the valley portions and the shaft, stress concentration onto the peak portions and the valley portions can be effectively distributed and equalized. As a result, the abrasion resistance and the fatigue resistance of the boot can be enhanced. Further, those advantages enable provision of a boot for a constant velocity universal joint having higher durability, and the entire boot can be compactified under such a state as to have durability equivalent to that of conventional boots.

In particular, the following setting is more effective to distribution and equalization of stress: an outer diameter of one of the peak portions is set to be smaller than a straight line connecting radially outer ends of others of the peak portions, the one of the peak portions being positioned at a central portion and having a large curvature radius, the others of the peak portions being respectively on the large diameter section side and the small diameter section side and being adjacent to the one of the peak portions.

Further, when the valley portion is formed into the U-shape in cross-section, durability (fatigue resistance of the valley portion and prevention of dent of the bellows section) can be further enhanced. When the valley portion is formed into the U-shape in cross-section and the coupling portion for coupling the peak portion and the valley portion is formed into the linear shape, the bellows section can be smoothly fold-deformed at a high operating angle.

The boot according to the present invention is applicable to boots for use in constant velocity universal joints of any type, such as a fixed type constant velocity universal joint and a plunging type constant velocity universal joint. In particular, it is more effective to apply the present invention to constant velocity universal joints of such a type as to be capable of forming high operating angles.

As a material of the boot, a thermoplastic polyester-based elastomer having a type-D durometer hardness according to JIS K6253 of 35 or more and 50 or less is used, and hence the boot is excellent in fatigue resistance, abrasion resistance, and high-speed rotatability (twist-turning property at the time of rotation), and is capable of exerting stable functions as a boot over a long period of time.

DETAILED DESCRIPTION OF THE INVENTION

Figure 1A:
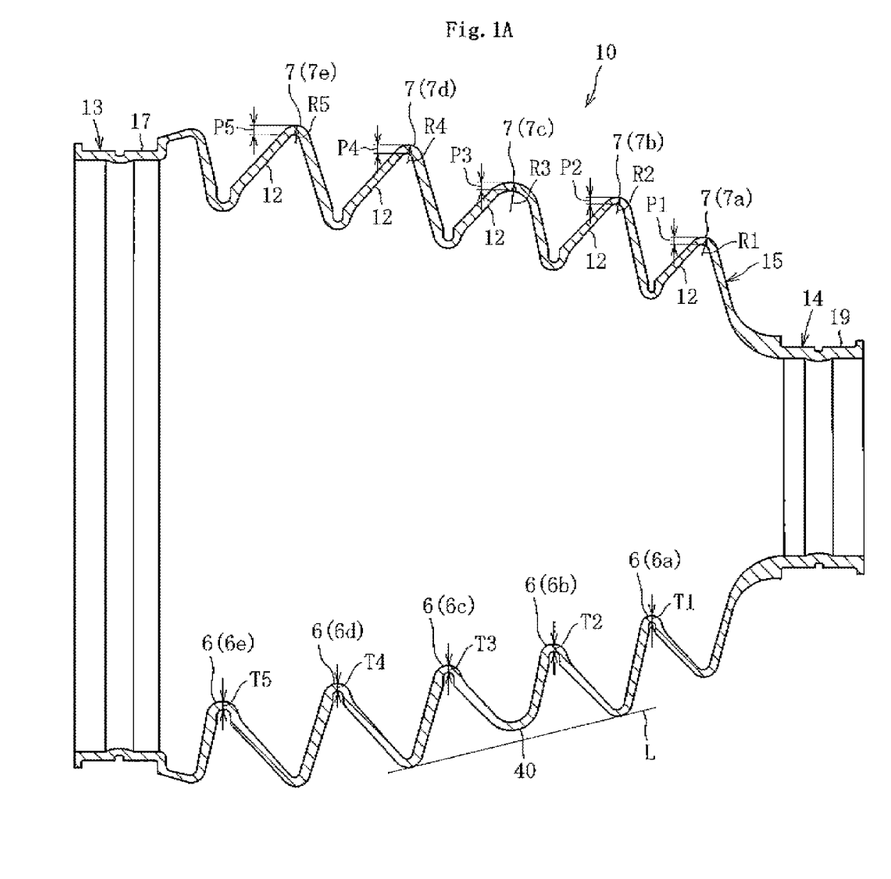
FIGS. 1A-1C are sectional views of boots for a constant velocity universal joint, illustrating embodiments of the present invention.

In the following, description is made of embodiments of the present invention with reference to FIGS. 1A to 3. FIG. 1A illustrates a boot for a constant velocity universal joint according to the present invention, and FIG. 2A illustrates a constant velocity universal joint using the boot for a constant velocity universal joint.

Figure 2A:
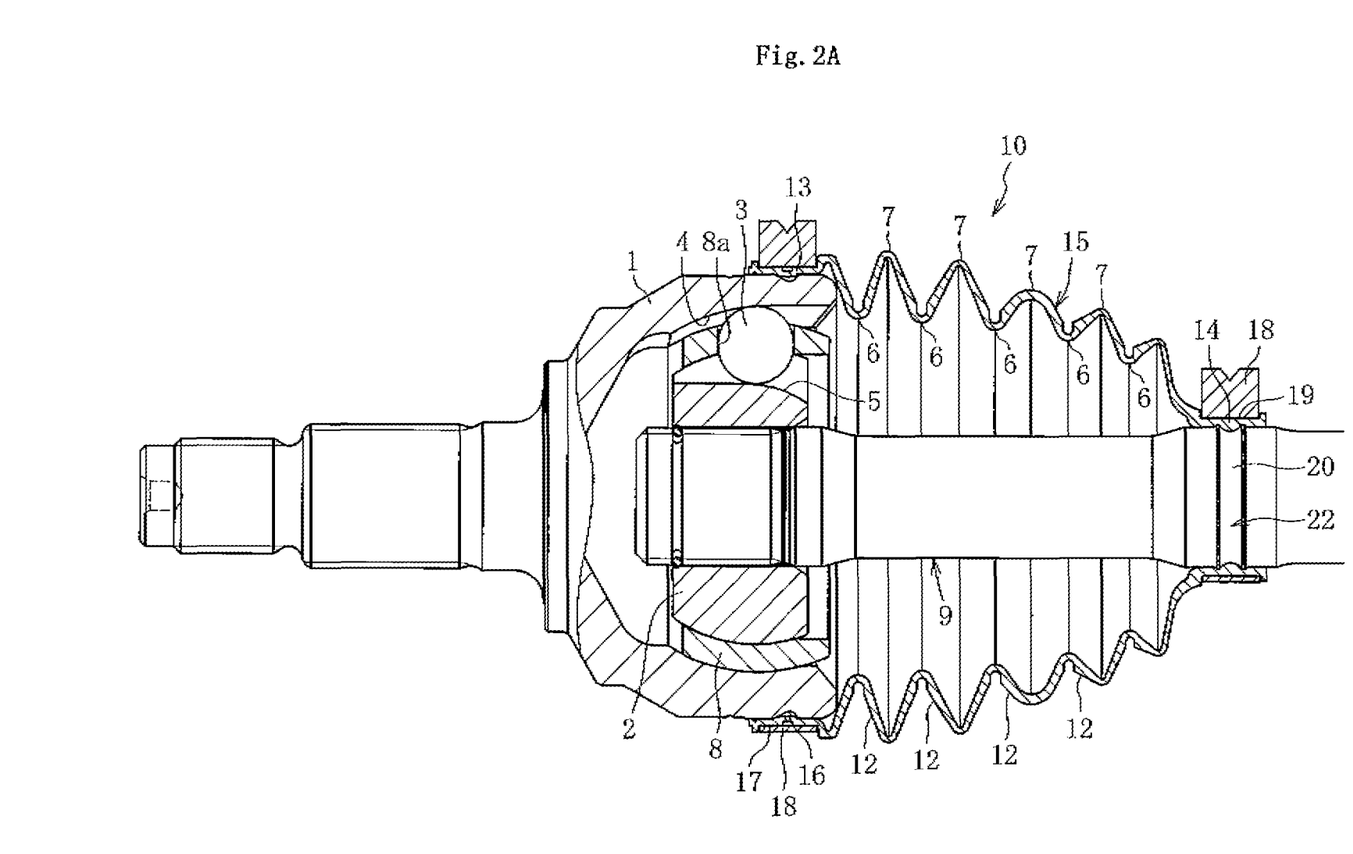
FIGS. 2A and 2B are sectional views of constant velocity universal joints using the boots for a constant velocity universal joint.

As illustrated in FIG. 2A, the constant velocity universal joint includes an outer race 1 as an outer joint member having an inner peripheral surface provided with a plurality of guide grooves (track grooves) 4 formed in an axial direction, an inner race 2 as an inner joint member having an outer peripheral surface provided with a plurality of guide grooves (track grooves) 5, a plurality of balls 3 arranged in ball tracks formed by cooperation of the guide grooves 4 of the outer race 1 and the guide grooves 5 of the inner race 2, and a cage 8 including pockets 8a for accommodating the balls 3. Further, a shaft 9 is coupled to an inner periphery of the inner race 2 through intermediation of a torque transmitting means such as serrations and splines. Note that, the constant velocity universal joint in this embodiment is such an undercut free type (UJ) that each of the guide grooves 4 and 5 includes a circular arc portion and a linear portion.

A boot 10 for a constant velocity universal joint is made of a thermoplastic elastomer such as an ester-based one, an olefin-based one, a urethane-based one, an amide-based one, or a styrene-based one. The thermoplastic elastomer has an intermediate property between those of resins and rubbers. The thermoplastic elastomer can be processed with a normal molding machine for thermoplastic resins.

Further, the boot 10 for a constant velocity universal joint may be made of a thermoplastic polyester-based elastomer having a type-D durometer hardness according to JIS K6253 (enacted in 1993) of 35 or more and 50 or less. The thermoplastic polyester-based elastomer is a material having an intermediate elastic modulus between those of markedly flexible materials such as a vulcanized rubber and highly-rigid thermoplastic resins such as polystyrene, polyamide, and polybutylene terephthalate. The thermoplastic polyester-based elastomer is such a material as to have characteristics of both those of the vulcanized rubber and the highly-rigid thermoplastic resins, that is, exhibit characteristics such as rubber elasticity by which an original shape is restored even after deformation, mechanical strength higher than that of the vulcanized rubber, and thermoplasticity which allows application of all mold processing methods applicable to general thermoplastic resins.

The boot 10 for a constant velocity universal joint includes a large diameter section 13 mounted to an opening end portion of the outer joint member (outer race 1) of the constant velocity universal joint, and a small diameter section 14 mounted to the shaft 9 coupled to the inner joint member (inner race 2) of the constant velocity universal joint, and a bellows section 15 provided between the large diameter section 13 and the small diameter section 14 and including peak portions 7 and valley portions 6 alternately arranged along the axial direction. The peak portions 7 and the valley portions 6 are coupled to each other through intermediation of inclined portions (coupling portions) 12.

A boot fixing portion 16 formed of a groove along a circumferential direction is provided in an outer peripheral surface on an opening portion side of the outer race 1, and the large diameter section 13 is externally fitted to the boot fixing portion 16. A boot band 18 is fitted into a fitting groove 17 formed in an outer peripheral surface of the large diameter section 13 of the boot 10 so that the large diameter section 13 is fixed to the outer race 1.

On the shaft 9, a boot fixing portion 22 including a boot fixing groove 20 along the circumferential direction is provided at such a position as to be projected from the outer race 1 by a predetermined amount. With this, the small diameter section 14 is externally fitted to the boot fixing portion 22. The boot band 18 is fitted into a fitting groove 19 formed in an outer peripheral surface of the small diameter section 14 of the boot 10 so that the small diameter section 14 is fixed to the shaft 9.

As illustrated in FIG. 1A, in the bellows section 15, the valley portion 6 is formed into a U-shape in cross-section, and the coupling portion 12 for coupling the valley portion 6 and the peak portion 7 is formed into a linear shape. In this case, in the bellows section 15, the peak portions 7 are respectively referred to as a first peak 7a, a second peak 7b, a third peak 7c, a fourth peak 7d, and a fifth peak 7e from the small diameter section 14 side to the large diameter section 13. Similarly, the valley portions 6 are respectively referred to as a first valley 6a, a second valley 6b, a third valley 6c, a fourth valley 6d, and a fifth valley 6e from the small diameter section 14 side to the large diameter section 13.

A radially outer portion of each of the peak portions 7 in vertical cross-section of the boot is formed into a round shape. A curvature radius R3 of a radially outer portion of one of the peak portions 7 (7c) positioned at a central portion between the large diameter section 13 and the small diameter section 14 is set to be larger than curvature radii R1, R2, R4, and R5 of respective radially outer portions of other peak portions 7 (7a, 7b, 7d, and 7e).

That is, R3 is larger than R1, R2, R4, and R5. In this case, the relation R1=R2=R4=R5 or R1≠R2≠R4≠R5 may be established. Further, in the relation, = and ≠ can be arbitrarily combined with each other. In this case, as described below, it is preferred to set R3 to be 1.3 times or more and less than 4 times as large as R1, R2, R4, and R5.

As illustrated in FIG. 1A, it is preferred to arrange a radially outer end 40 of the one of the peak portions 7 (7c) on a radially inner side with respect to a straight line L connecting radially outer ends of the peak portions 7b and 7d which are respectively on the large diameter section side and the small diameter section side and are adjacent to the one of the peak portions 7 (7c), the one of the peak portions 7 (7c) being positioned at the central portion and having a larger curvature radius.

The relation P2<P1≦P3<P4≦P5 is established where a thickness of the first peak 7a is P1, a thickness of the second peak 7b is P2, a thickness of the third peak 7c is P3, a thickness of the fourth peak 7d is P4, and a thickness of the fifth peak 7e is P5.

The thickness P2 of the second peak 7b is set so as not to exceed thicknesses T1 and T2 of the valley portions 6 (first valley 6a and second valley 6b) adjacent to the second peak 7b. That is, the thickness P2 of the second peak 7b is set to be equal to or smaller than the respective thicknesses T1 and T2 of the first valley 6a and the second valley 6b. Further, the thicknesses P (P1, P3, P4 and P5) of the peak portions 7 other than the second peak 7b are larger than the thicknesses T (T1, T2, T3, T4, and T5) of the valley portions 6 adjacent thereto.

In the present invention, by the above-mentioned setting of the curvature radii of the radially outer portions of the peak portions 7, stress onto the peak portions 7 and the valley portions 6 can be distributed and equalized, which leads to enhancement of abrasion resistance and fatigue resistance of the boot 10. That is, when the constant velocity universal joint forms an operating angle, the boot 10 is capable of firmly maintaining a shape even at a high operating angle while being flexibly deformed. Thus, at the time of deformation of the boot 10, an interference pressure between the peak portions, an interference pressure between the valley portions 6 and the shaft 9, stress concentration onto the peak portions 7 and the valley portions 6 can be effectively distributed and equalized. As a result, the abrasion resistance and the fatigue resistance of the boot 10 can be enhanced. Further, those advantages enable provision of the boot 10 for a constant velocity universal joint having higher durability, and the entire boot can be compactified under such a state as to have durability equivalent to that of conventional boots.

Note that, when R3 is less than 1.3 times as large as R1, R2, R4, and R5, the stress onto the peak portions 7 and the valley portions 6 cannot be sufficiently distributed or equalized. Meanwhile, even when R3 is 4 times or more as large as R1, R2, R4, and R5, functions and advantages are equal to those in a case where R3 is less than 4 times as large as R1, R2, R4, and R5. Further disadvantageously, there is such a risk that it is difficult to exert such functions and advantages.

In particular, the radially outer end 40 of the one of the peak portions 7 (7c) is arranged on the radially inner side with respect to the straight line L connecting the radially outer ends of the peak portions 7b and 7d which are respectively on the large diameter section side and the small diameter section side and are adjacent to the one of the peak portions 7 (7c), the one of the peak portions 7 (7c) being positioned at the central portion and having the larger curvature radius. Thus, at a high operating angle, in such a phase that the bellows section is compressed, the one of the peak portions is held in contact entirely with peak portions on both sides thereof, the one of the peak portions having a small outer-diameter dimension. As a result, the bellows section is suitable to smooth fold-deformation. In other words, stress is more effectively distributed and equalized.

Further, when the valley portion 6 is formed into the U-shape in cross-section, durability (fatigue resistance of the valley portion and prevention of depression of the bellows section) can be further enhanced. When the valley portion 6 is formed into the U-shape in cross-section and the coupling portion 12 for coupling the peak portion 7 and the valley portion 6 is formed into the linear shape, the bellows section 15 can be smoothly fold-deformed at a high operating angle.

As a material of the boot, a thermoplastic polyester-based elastomer having a type-D durometer hardness according to JIS K6253 of 35 or more and 50 or less is used, and hence the boot is excellent in fatigue resistance, abrasion resistance, and high-speed rotatability (twist-turning property at the time of rotation), and is capable of exerting stable functions as a boot over a long period of time. Note that, when the type-D durometer hardness according to JIS K6253 is less than 35 or more than 50, abrasion resistance and fatigue resistance are not markedly excellent.

As described above, the boot of the present invention is applicable to constant velocity universal joints of any type, such a type as to be capable of forming high operating angles of θ=45 degrees or more (for example, fixed type constant velocity universal joints of Rzeppa type and Birfield type) and such a type as to include a mechanism which slides in the axial line direction of the outer joint member (for example, plunging type constant velocity universal joints of double offset type, tripod type, cross groove type, and the like). With this, it is possible to form a constant velocity universal joint that is excellent in durability and has the boot for a constant velocity universal joint excellent in abrasion resistance and fatigue resistance mounted thereon. That is, the present invention is suitable to achieve the following object: to smoothly fold the peak portions 7 of the bellows section 15 in the boot at a high operating angle while maintaining appropriate rigidity.

As another embodiment, the curvature radii R2 and R3 (or R3 and R4) of the radially outer portions of the two peaks 7b and 7c (or 7c and 7d) positioned at the central portion between the large diameter section 13 and the small diameter section 14 may be set to be larger than the curvature radii R1, R4, and R5 (or R1, R2, and R5) of the radially outer portions of the other peak portions 7a, 7d, and 7e (or 7a, 7b, and 7e). That is, R2 and R3 may be larger than R1, R4, and R5, or R3 and R4 may be larger than R1, R2, and R5. Also in those cases, = and ≠ can be arbitrarily combined with each other on both a side of larger curvature radii and a side of smaller curvature radii.

In the above-mentioned embodiment, a case is illustrated where the number of the peak portions 7 is five, but as other embodiments, the number of the peak portions 7 may be three, the number of the peak portions 7 may be four, or the number of the peak portions 7 may be six. In other words, in the bellows section 15 of the present invention, it suffices that the number of the peak portions 7 is three or more and the number of the valley portions is three or more.

When the number of the peak portions 7 is three, the first peak 7a, the second peak 7b, and the third peak 7c are provided, and hence R2 is larger than R1 and R3. In this case, the relation R1=R3 or R1≠R3 may be established. Further, it is preferred to establish the relation P2<P1≦P3.

Figure 1B:
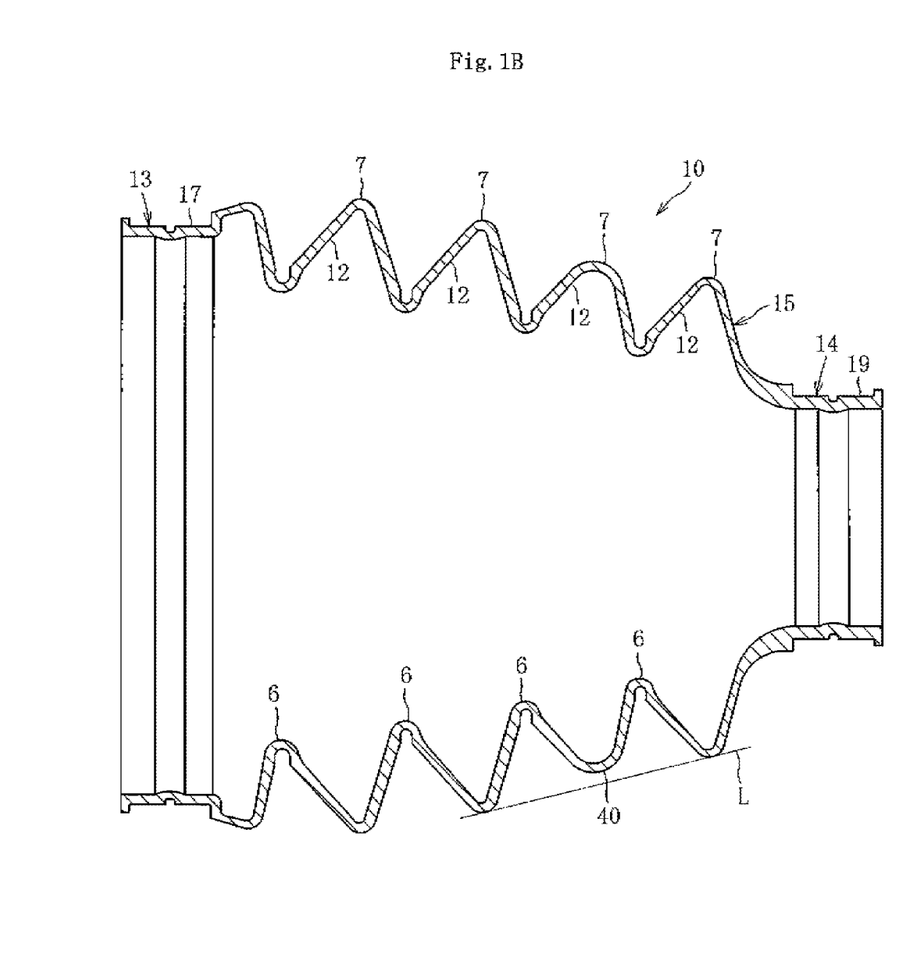

When the number of the peak portions 7 is four as illustrated in FIG. 1B, the first peak 7a, the second peak 7b, the third peak 7c, and the fourth peak 7d are provided. Thus, R2 is larger than R1, R3, and R4, R3 is larger than R1, R2, and R4, or R2 and R3 are larger than R1 and R4. When R2 is larger than R1, R3, and R4, the relation R1=R3=R4 or R1≠R3≠R4 may be established. Further, in the relation, = and ≠ can be arbitrarily combined with each other. When R3 is larger than R1, R2, and R4, the relation R1=R2=R4 or R1≠R2≠R4 may be established. Further, in the relation, = and ≠ can be arbitrarily combined with each other. When R2 and R3 are larger than R1 and R4, the relation R2=R3, R2≠R3, R1=R4, or R1≠R4 may be established. As in this case, when the number of the peak portions 7 is four, it is preferred to establish the relation P2<P1<P3≦P4.

Figure 1C:
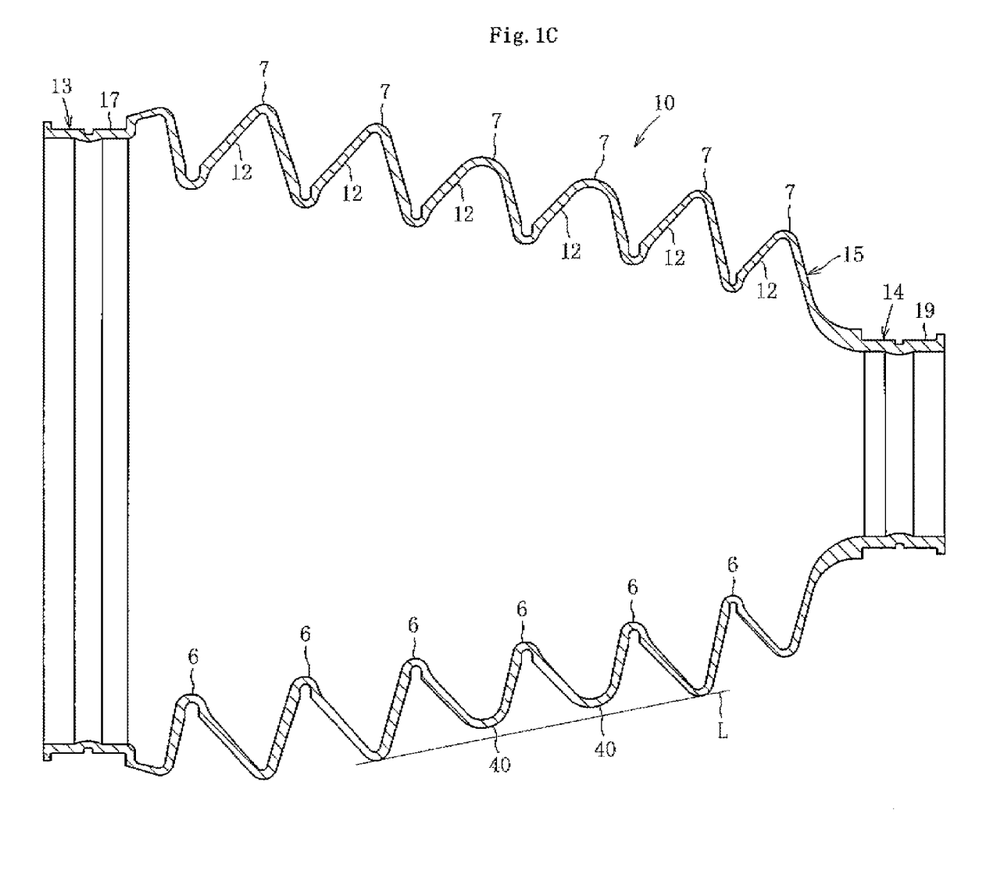

When the number of the peak portions 7 is six as illustrated in FIG. 1C, the first peak 7a, the second peak 7b, the third peak 7c, the fourth peak 7d, the fifth peak 7e, and a sixth peak 7f are provided. Thus, R3 is larger than R1, R2, R4, R5, and R6, R4 is larger than R1, R2, R3, R5, and R6, or R3 and R4 are larger than R1, R2, R5, and R6. When R3 is larger than R1, R2, R4, R5, and R6, the relation R1=R2=R4=R5=R6 or R1≠R2≠R4≠R5≠R6 may be established. Further, in the relation, = and ≠ can be arbitrarily combined with each other. When R4 is larger than R1, R2, R3, R5, and R6, the relation R1=R2=R3=R5=R6 or R1≠R2≠R3≠R5≠R6 may be established. Further, in the relation, = and ≠ can be arbitrarily combined with each other. When R3 and R4 are larger than R1, R2, R5, and R6, the relation R3=R4, R3≠R4, R1=R2=R5=R6, or R1≠R2≠R5≠R6 may be established. Further, in the relation, = and ≠ can be arbitrarily combined with each other. As in this case, when the number of the peak portions 7 is six, it is preferred to establish the relation P2<P1≦P3<P4≦P5.

Even when the number of the peak portions 7 is three, the number of the peak portions 7 is four, or the number of the peak portions 7 is six, as described above, by setting of the curvature radii of the radially outer portions of the peak portions 7 and the thicknesses of the peak portions 7 and the valley portions 6, stress onto the peak portions 7 and the valley portions 6 can be distributed and equalized, which leads to enhancement of abrasion resistance and fatigue resistance of the boot 10. Note that, even when the number of the peak portions 7 is three, the number of the peak portions 7 is four, or the number of the peak portions 7 is six, for the above-mentioned reasons, it is preferred to set the curvature radius of the one of the peak portions 7 to be 1.3 times or more and 4 times or less as large as the curvature radii of the other peak portions each having a small curvature radius, the one of the peak portions 7 having a large curvature radius.

Figure 2B:
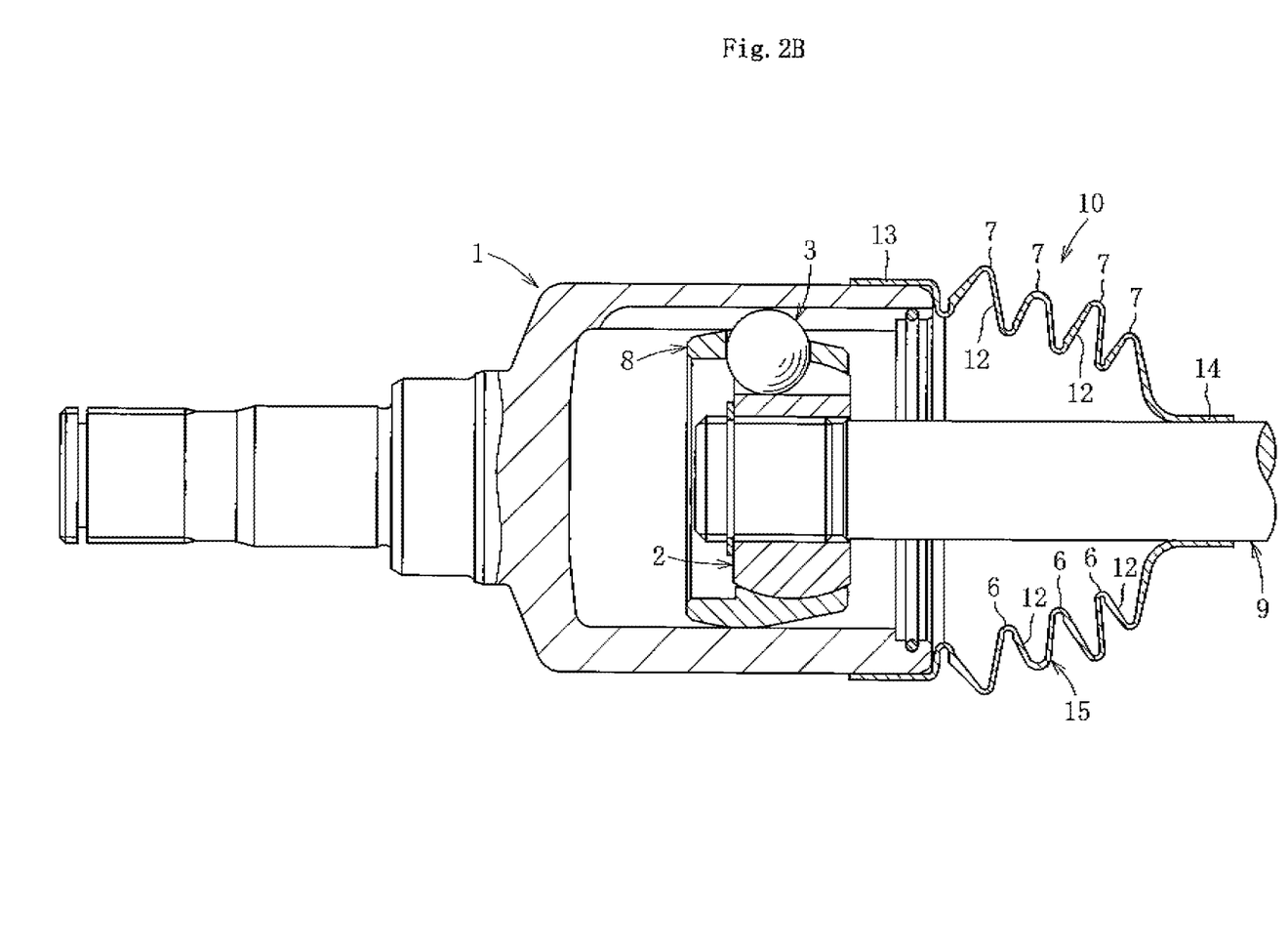

Hereinabove, although description is made of the embodiments of the present invention, the present invention is not limited to the above-mentioned embodiments, and various modifications may be made thereto. For example, the number of the peak portions 7 may be seven or more. Further, as for plunging type constant velocity universal joints, as illustrated in FIG. 2B, operating angles thereof are lower than those of fixed type constant velocity universal joints. Thus, a thermoplastic polyester-based elastomer having a type-D durometer hardness of more than 50 can be used. Alternatively, also in fixed type constant velocity universal joints, operating angles thereof are low. Thus, when the present invention is applied to a rear-wheel drive shaft in the fixed type constant velocity universal joints, a thermoplastic polyester-based elastomer having a type-D durometer hardness of more than 50 can be used. In this case, a boot excellent in high-speed rotatability can be obtained.

INDUSTRIAL APPLICABILITY

The present invention is applicable to boots for use in constant velocity universal joints of any type, such a fixed type as to allow only angular displacement (Rzeppa type, Birfield type, and the like) and such a plunging type as to allow both the angular displacement and axial displacement (double offset type, tripod type, cross groove type, and the like).

REFERENCE SIGNS LIST 6 valley portion
7 peak portion
9 shaft
12 coupling portion
13 large diameter section
14 small diameter section
15 bellows section

The invention claimed is:

1. A boot for a constant velocity universal joint, the boot comprising:
    a large diameter section to be mounted to an outer joint member of a constant velocity universal joint;
    a small diameter section to be mounted to a shaft coupled to an inner joint member of the constant velocity universal joint; and
    a bellows section arranged between the large diameter section and the small diameter section,
    wherein the bellows section comprises three or more peak portions, three or more valley portions arranged alternately with the three or more peak portions along an axial direction, and coupling portions coupling the peaks portions and the valley portions that are respectively adjacent to each other,
    wherein the coupling portions are inclined portions in a stress-free state, and a radially outer portion of each of the three or more peak portions in vertical cross-section of the boot is formed into a round shape,
    wherein a stress distributing and equalizing structure and a smooth fold-deformation enabling structure are configured by one or two of the three or more peak portions positioned at a central portion between the large diameter section and the small diameter section,
    wherein the stress distributing and equalizing structure is configured by setting a curvature radius of a radially outer portion of a peak portion that is positioned only at the central portion between the large diameter section and the small diameter section to be larger by 1.3 times or more and less than 4 times than curvature radii of the radially outer portions of others of the three or more peak portions including a peak portion arranged adjacent to the large diameter section and a peak portion arranged adjacent to the small diameter section, and the smooth fold-deformation enabling structure is configured by having a radially outer end of the peak portion at the central portion between the large diameter section and the small diameter section and having the larger curvature radius positioned at a radially inner side with respect to a straight line connecting a radially outer end of a peak portion on a large diameter section side and a radially outer end of a peak portion on a small diameter section side that are adjacent to the peak portion having the larger curvature radius, and
    wherein one stress distributing and equalizing structure and one smooth fold-deformation enabling structure are provided at the central portion between the large diameter section and the small diameter section.

2. A boot for a constant velocity universal joint according to claim 1, wherein the curvature radii of the radially outer portions of the others of the three or more peak portions except the one or two of the three or more peak portions are set to be equal to each other, the one or two of the three or more peak portions being positioned at the central portion.

3. A boot for a constant velocity universal joint according to claim 2,
    wherein the bellows section comprises an odd number of the three or more peak portions and an odd number of the three or more valley portions, and
    wherein the curvature radius of the radially outer portion of the peak portion of the three or more peak portions is set to be larger than the curvature radii of the radially outer portions of the others of the three or more peak portions, the peak portion of the three or more peak portions being positioned at the central portion between the large diameter section and the small diameter section.

4. A boot for a constant velocity universal joint according to claim 3, wherein a radially outer end of each of the one or two of the three or more peak portions is arranged on a radially inner side with respect to a straight line connecting radially outer ends of the others of the three or more peak portions, the others of the three or more peak portions being respectively on the large diameter section side and the small diameter section side and being adjacent to the one or two of the three or more peak portions, each of the one or two of the three or more peak portions being positioned at the central portion and having a curvature radius that is larger than the others of the three or more peak portions.

5. A boot for a constant velocity universal joint according to claim 2, wherein a radially outer end of each of the one or two of the three or more peak portions is arranged on a radially inner side with respect to a straight line connecting radially outer ends of the others of the three or more peak portions, the others of the three or more peak portions being respectively on the large diameter section side and the small diameter section side and being adjacent to the one or two of the three or more peak portions, each of the one or two of the three or more peak portions being positioned at the central portion and having a curvature radius that is larger than the others of the three or more peak portions.

6. A boot for a constant velocity universal joint according to claim 2,
wherein a thickness of an adjacent one of the three or more peak portions adjacent to a nearest one of the three or more peak portions nearest to the small diameter section is set to be equal to or smaller than thicknesses of adjacent ones of the three or more valley portions adjacent to the adjacent one of the three or more peak portions, and
wherein thicknesses of others of the three or more peak portions other than the adjacent one of the three or more peak portions are set to be larger than thicknesses of adjacent ones of the three or more valley portions adjacent to the others of the three or more peak portions other than the adjacent one of the three or more peak portions.

7. A boot for a constant velocity universal joint according to claim 1,
wherein the curvature radii of the radially outer portions of two of the three or more peak portions that are positioned at the central portion between the large diameter section and the small diameter section are set to be larger than the curvature radii of the radially outer portions of the others of the three or more peak portions,
wherein the curvature radii of the radially outer portions of the two of the three or more peak portions with the larger curvature radii are set to be equal to each other, and
wherein the curvature radii of the radially outer portions of the others of the three or more peak portions are set to be equal to each other.

8. A boot for a constant velocity universal joint according to claim 7, wherein a radially outer end of each of the one or two of the three or more peak portions is arranged on a radially inner side with respect to a straight line connecting radially outer ends of the others of the three or more peak portions, the others of the three or more peak portions being respectively on the large diameter section side and the small diameter section side and being adjacent to the one or two of the three or more peak portions, each of the one or two of the three or more peak portions being positioned at the central portion and having a curvature radius that is larger than the others of the three or more peak portions.

9. A boot for a constant velocity universal joint according to claim 7,
wherein a thickness of an adjacent one of the three or more peak portions adjacent to a nearest one of the three or more peak portions nearest to the small diameter section is set to be equal to or smaller than thicknesses of adjacent ones of the three or more valley portions adjacent to the adjacent one of the three or more peak portions, and
wherein thicknesses of others of the three or more peak portions other than the adjacent one of the three or more peak portions are set to be larger than thicknesses of adjacent ones of the three or more valley portions adjacent to the others of the three or more peak portions other than the adjacent one of the three or more peak portions.

10. A boot for a constant velocity universal joint according to claim 1,
wherein the bellows section comprises an odd number of the three or more peak portions and an odd number of the three or more valley portions, and
wherein the curvature radius of the radially outer portion of the peak portion of the three or more peak portions is set to be larger than the curvature radii of the radially outer portions of the others of the three or more peak portions, the peak portion of the three or more peak portions being positioned at the central portion between the large diameter section and the small diameter section.

11. A boot for a constant velocity universal joint according to claim 10, wherein a radially outer end of each of the one or two of the three or more peak portions is arranged on a radially inner side with respect to a straight line connecting radially outer ends of the others of the three or more peak portions, the others of the three or more peak portions being respectively on the large diameter section side and the small diameter section side and being adjacent to the one or two of the three or more peak portions, each of the one or two of the three or more peak portions being positioned at the central portion and having a curvature radius that is larger than the others of the three or more peak portions.

12. A boot for a constant velocity universal joint according to claim 10,
wherein a thickness of an adjacent one of the three or more peak portions adjacent to a nearest one of the three or more peak portions nearest to the small diameter section is set to be equal to or smaller than thicknesses of adjacent ones of the three or more valley portions adjacent to the adjacent one of the three or more peak portions, and
wherein thicknesses of others of the three or more peak portions other than the adjacent one of the three or more peak portions are set to be larger than thicknesses of adjacent ones of the three or more valley portions adjacent to the others of the three or more peak portions other than the adjacent one of the three or more peak portions.

13. A boot for a constant velocity universal joint according to claim 1, wherein a radially outer end of each of the one or two of the three or more peak portions is arranged on a radially inner side with respect to a straight line connecting radially outer ends of the others of the three or more peak portions, the others of the three or more peak portions being respectively on the large diameter section side and the small diameter section side and being adjacent to the one or two of the three or more peak portions, each of the one or two of the three or more peak portions being positioned at the central portion and having a curvature radius that is larger than the others of the three or more peak portions.

14. A boot for a constant velocity universal joint according to claim 13,
wherein a thickness of an adjacent one of the three or more peak portions adjacent to a nearest one of the three or more peak portions nearest to the small diameter section is set to be equal to or smaller than thicknesses of adjacent ones of the three or more valley portions adjacent to the adjacent one of the three or more peak portions, and
wherein thicknesses of others of the three or more peak portions other than the adjacent one of the three or more peak portions are set to be larger than thicknesses of adjacent ones of the three or more valley portions adjacent to the others of the three or more peak portions other than the adjacent one of the three or more peak portions.

15. A boot for a constant velocity universal joint according to claim 1,
wherein a thickness of an adjacent one of the three or more peak portions adjacent to a nearest one of the three or more peak portions nearest to the small diameter section is set to be equal to or smaller than thicknesses of adjacent ones of the three or more valley portions adjacent to the adjacent one of the three or more peak portions, and
wherein thicknesses of others of the three or more peak portions other than the adjacent one of the three or more peak portions are set to be larger than thicknesses of adjacent ones of the three or more valley portions adjacent to the others of the three or more peak portions other than the adjacent one of the three or more peak portions.

16. A boot for a constant velocity universal joint according to claim 1, wherein the following relations are satisfied:

P2<P1<P3≦P4: when the three or more peak portions of the bellows section is four peak portions;

P2<P1≦P3<P4≦P5: when the three or more peak portions of the bellows section is five peak portions; and P2<P1≦P3<P4≦P5≦P6: when the three or more peak portions of the bellows section is six peak portions, where P1-P6 represent thicknesses of the three or more peak portions positioned in order from the small diameter section side.

17. A boot for a constant velocity universal joint according to claim 1, wherein each of the three or more valley portions is formed into a U-shape in cross-section, and wherein the coupling portions coupling the three or more peak portions and the three or more valley portions are each formed into a linear shape.

18. A boot for a constant velocity universal joint according to claim 1, wherein the boot is made of a thermoplastic polyester-based elastomer having a type-D durometer hardness according to JIS K6253 of 35 to 50.

19. A constant velocity universal joint, which is a fixed type constant velocity universal joint that allows only displacement of an operating angle and is capable of forming an operating angle of 45 degrees or more, the constant velocity universal joint comprising the boot for a constant velocity universal joint according to claim 1.

20. A constant velocity universal joint, which is a plunging type constant velocity universal joint that allows displacement in an axial direction and displacement of an operating angle, the constant velocity universal joint comprising the boot for a constant velocity universal joint according to claim 1.

* * * * *